United States Patent
Chen (10) Patent No.: US 8,902,707 B2
(45) Date of Patent: Dec. 2, 2014

(54) ANALYSIS OF UNCERTAINTY OF HYPOCENTER LOCATION USING THE COMBINATION OF A VSP AND A SUBSURFACE ARRAY

(75) Inventor: Zuolin Chen, Calgary (CA)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/046,629

(22) Filed: Mar. 12, 2008

(65) Prior Publication Data

US 2008/0247269 A1  Oct. 9, 2008

Related U.S. Application Data

(60) Provisional application No. 60/910,751, filed on Apr. 9, 2007.

(51) Int. Cl.
   *G01V 1/00* (2006.01)
   *G01V 1/42* (2006.01)

(52) U.S. Cl.
   CPC ........................................ *G01V 1/42* (2013.01)
   USPC .......................................................... 367/57

(58) Field of Classification Search
   USPC .................... 367/25, 37, 38, 56, 57
   See application file for complete search history.

(56) References Cited

U.S. PATENT DOCUMENTS

| | | | | |
|---|---|---|---|---|
| 5,201,223 A * | 4/1993 | McQueen | ........................ | 73/295 |
| 6,023,657 A | 2/2000 | Kerekes | | |
| 6,253,848 B1 * | 7/2001 | Reimers et al. | ............ | 166/254.1 |
| 6,389,361 B1 | 5/2002 | Geiser | | |
| 7,236,886 B2 * | 6/2007 | Frenkel | ............................. | 702/6 |
| 7,457,195 B2 * | 11/2008 | Jones | ............................... | 367/38 |
| 7,663,970 B2 * | 2/2010 | Duncan et al. | ................... | 367/38 |
| 2005/0190649 A1 * | 9/2005 | Eisner et al. | .................... | 367/38 |
| 2006/0122780 A1 * | 6/2006 | Cohen et al. | .................... | 702/14 |
| 2008/0080308 A1 * | 4/2008 | Hornby | ............................ | 367/15 |
| 2008/0151691 A1 * | 6/2008 | Eisner et al. | .................... | 367/38 |
| 2008/0259727 A1 * | 10/2008 | Drew | ............................... | 367/25 |
| 2009/0299637 A1 * | 12/2009 | Dasgupta | ........................ | 702/12 |

FOREIGN PATENT DOCUMENTS

CA   2580355 A1   3/2006
WO   WO 2005089404 A   9/2005

OTHER PUBLICATIONS

R. Evans et al.; "Borehole seismic: supplying answers to fractured reservoir questions," SPE 58994, XP-002487026, 2000 SPE International Petroleum Conference and Exhibition, Feb. 1-3, 2000, pp. 1-8.
K.D. Mahrer et al.; "Simultaneous Recording of Hydraulic-Fracture-Induced Microseisms in the Treatment Well and in a Remote Well," SPE 106025, XP-002487027, 2007 SPE Hydraulic Fracturing Technology Conference, College Station, Texas, USA, Jan. 29-31, 2007, pp. 1-4.

(Continued)

*Primary Examiner* — Isam Alsomiri
*Assistant Examiner* — James Hulka
(74) *Attorney, Agent, or Firm* — Mossman, Kumar & Tyler, P.C.

(57) ABSTRACT

Acoustic signals resulting from microseismic events in the subsurface are received in a first array of detectors deployed in a borehole and in a second array of detectors at or near the surface of the earth. The signals are converted to give the locations of the microseismic events.

19 Claims, 8 Drawing Sheets

(56) References Cited

OTHER PUBLICATIONS

Jack F. Evernden; Precision of Epicenters Obtained by Small Numbers of World-Wide Stations, Bulletin of the Seismological Society of America, vol. 59, No. 3, Jun. 1969, pp. 1365-1398.

G. Poupinet et al.; Monitoring Velocity Variations in the Crust Using Earthquake Doublets: An Application to the Calaveras Fault, California, Journal of Geophysical Research, vol. 89, No. B7, Jul. 10, 1984, pp. 5719-5731.

W. Scott Phillips et al., Induced Microearthquake Patterns in Hydrocarbon and Geothermal Reservoirs, Pageoph, Mar. 2000, LAUR 00-1328, pp. 1-29.

James T. Rutledge et al.; Reservoir characterization using oil-production-induced microseismicity, Clinton County, Kentucky, Tectonophysics 289, (1998), pp. 129-152.

W.S. Phillips et al.; Induced microearthquake patterns and oil-producing fracture systems in the Austin chalk, Tectonophysics 289, (1998), pp. 153-169.

Volker Oye et al.; Automated seismic event location for hydrocarbon reservoirs, Computers & Geosciences 29, (2003) pp. 851-863.

Edward A. Flinn; Confidence Regions and Error Determinations for Seismic Event Location, Reviews of Geophysics, vol. 3, No. 1, Feb. 1965, pp. 157-.

J.P. Butler et al.; Estimating Solutions of First Kind Integral Equations with Nonnegative Constraints and Optimal Smoothing, Siam J. Numer. Anal., vol. 18, No. 3, Jun. 1981, pp. 381-397.

John E. Vidale, Complex Polarization Analysis of Particle Motion, Bulletin of the Seismological Society of America, vol. 76, No. 5, Oct. 1986, pp. 1393-1405.

H. Fabriol, Saline Aquifer $CO_2$ Storage (SACS) Feasibility study of microseismic monitoring (Task 5.8), BRGM/RP-51293-FR, Dec. 2001, pp. 1-64.

Zuolin Chen et al.; Estimates of the hypocenter location errors of passive microseismic events located by using a 3-C VSP downhole geophone array, SEG International Convention Extended Abstracts, 2006, pp. 1-4.

Fred W. Klein; User's Guide to HYPOINVERSE-2000, a Fortran Program to Solve for Earthquake Locations and Magnitudes, USGS, http:/geopubs.wr.usgs.gov/open-file/of02-171/, Apr. 9, 2007, pp. 1-3.

H.J. Vinegar et al.; Active and Passive Seismic Imaging of a Hydraulic Fracture in Diatomite, JPT, Jan. 1992, pp. 28-34 (to p. 88), pp. 88-90.

Hiroshi Asanuma et al.; "Microseismic Monitoring of Hydraulic Stimulation at the Australian HDR Project in Cooper Basin," Proceedings World Geothermal Congress 2005, Antalya, Turkey, Apr. 24-29, 2005, pp. 1-5.

\* cited by examiner

ANALYSIS OF UNCERTAINTY OF HYPOCENTER LOCATION USING THE COMBINATION OF A VSP AND A SUBSURFACE ARRAY

CROSS-REFERENCES TO RELATED APPLICATIONS

This application claims priority from U.S. provisional patent application Ser. No. 60/910,751 filed on Apr. 9, 2007.

BACKGROUND OF THE DISCLOSURE

1. Field of the Disclosure

The present disclosure is directed towards the field of monitoring of subterranean formations. Specifically, the disclosure is a method and apparatus that uses seismic detectors to identify the location of microseismic events that occur in subsurface formations due to minerals mining, subsurface engineering or hydrocarbon-related production activities, including waste disposal operations.

2. Description of the Related Art

One aspect of hydrocarbon-related reservoir development includes fracturing of the reservoir. Such fracturing operations result in so-called "microseisms" which can be detected by suitable acoustic sensors in the subsurface or at the surface of the earth. This is discussed, for example, in U.S. Pat. No. 6,253,848 to Reimers et al., having the same assignee as the present disclosure and the contents of which are incorporated herein by reference. Microseismic activity may also occur in secondary recovery operations with $CO_2$ injection or steam injection at the interface between the injected fluid and original fluid in the earth formation. In such a situation, it is possible that the microseismic activity is more likely along pre-existing fractures in the earth formation (where the injected fluid has an easier flow path). Microseismic activity may also occur in waste-disposal operations where wastes are pumped into a formation below an impermeable layer. Microseismic activity may also occur in storage of gas in underground reservoirs and in disposal of $CO_2$ that may be recovered in oil and gas operations. These are examples of microseismic activity resulting from stress changes in the subsurface associated with flow of a fluid. Microseismic activity may also result from stress changes that may not be associated with a fluid flow: these commonly occur in mining operations wherein drilling into a mineral formation produces a change in the stress distribution in the formation.

In prior art methods, the monitoring and hypocenter location of passive microseisms in oil reservoirs is often accomplished by using a single Vertical Seismic Profile (VSP) downhole geophone array to derive information of azimuth, angle of inclination and P, S-phase first arrival times of the events recorded by the 3-C geophones (Oye and Roth, 2003). The term "hypocenter" refers to the point at which the first motion in an earthquake originates. In the context of the present disclosure, the term "hypocenter" refers to a location at which ground motion originates in operations such as a fracturing operation. The uncertainty of the hypocenter location using this kind of single VSP array is generally of the order of tens of meters and often needs many additional conditions to be met (Fabriol, 2001; Phillips et al., 1998; Rutledge et al, 1998). Using this method, the measurement of azimuth and angle of inclination of an event from a hodogram is often severely affected by the quality of P-wave arrivals such as S/N ratio, impulsivity, and the assumed velocity model (Vadale, 1986). Another weakness of the prior art methods is that the amplitudes of P-wave first arrival may be small and hard to detect, making it difficult to locate the origin of the microseismic event. The waste of numerous precious events recorded during a short-term temporary monitoring period of microseismicity could lead to the failure of a whole project. In addition, the measurement and evaluation of azimuth and angle of inclination of signals are often time-consuming and may be inaccurate. These disadvantages will greatly affect the accuracy and efficiency of the data processing and the estimated hypocenter location of microseismic monitoring. 3-C measurements made in a plurality of vertical arrays provide improved results. See U.S. Pat. No. 6,023,657 to Kerekes.

Hypocenter location using P and/or S-wave first arrival times have long been used and proved to be much more accurate than methods using a combination of azimuth, angle of inclination, and time difference between P, and S phases. Obviously, the straight line geometry of a single VSP is not suitable for the application of the arrival time method. An application of such a monitoring location method has been proposed by using multiple VSP arrays (Chen, 2006). In recent years, the emergence of the techniques of deployment of subsurface geophone arrays, has greatly improved the S/N ratio of events. The combination of a VSP and a subsurface array forms a network with geometry suitable for the application of such a hypocenter location method.

There is a need for an accurate and easy to deploy method for identifying the origins of microseismic events in the subsurface. The present disclosure addresses this need.

SUMMARY OF THE DISCLOSURE

One embodiment of the disclosure is a method of identifying a location of a microseismic event in an earth formation. A first array of acoustic detectors is deployed in a borehole in the earth formation. In addition, a second array of acoustic detectors is deployed at or near a surface of the earth formation. The detectors receive acoustic signals resulting from the microseismic event. A time of arrival of the received acoustic signals is used to estimate the location of the microseismic event and the determined location is recorded on a suitable medium. The acoustic detectors may be three component to detectors. The microseismic event may result from a stress change in the earth formation. The stress change may result from a fluid flow in the formation and/or a fracturing operation in the formation. The time of arrival may be the time of arrival of a compressional wave and/or a shear wave. The receiving of the acoustic signals may be done a plurality of times and a change in the location of the microseismic event may be identified. Remedial action based on the identified change in the location of the microseismic event may be taken. Identifying the location of the microseismic event may include identifying a direction of arrival of the received signals. The method may further include estimating a vertical location of the microseismic event and a horizontal location of the microseismic event. The method may further include determining a statistical measure of uncertainty of the vertical location of the microseismic event and a statistical measure of uncertainty of the horizontal location of the microseismic event. The determined measures of uncertainty may be used for changing a number of detectors in the second array.

Another embodiment is a system for identifying the location of a microseismic event in an earth formation. The system includes a first array of acoustic detectors in a borehole in the earth formation configured to receive acoustic signals resulting from the microseismic event, a second array of acoustic detectors at or near a surface of the earth configured to receive acoustic signals resulting from the microseismic event, and at least one processor configured to use a time of arrival of the received acoustic signals to estimate the location of the microseismic event, and record determined location on a suitable medium. This system may include a device for conducting a fracturing operation in the formation wherein the microseismic event results from a stress change in the earth formation resulting from the fracturing operation. The at least one processor may be further configured to use the time of arrival of a compressional wave and/or a shear wave. The first array of acoustic detectors and the second array of acoustic detectors may be further configured to receive acoustic signals at a plurality of additional times and the at least one processor may be further configured to identify a change in the location of the microseismic event using the acoustic signals received at the plurality of additional times. The at least one processor may be further configured to take remedial action based on the identified change in the location of the microseismic event. The at least one processor may be further configured to estimate the vertical position of the microseismic event and a horizontal position of the microseismic event. The at least one processor may be further configured to determine a statistical measure of uncertainty of the vertical position of the microseismic event and a statistical measure of the uncertainty off the horizontal position of the microseismic event.

Another embodiment of the disclosure is a computer readable medium for use with the system for identifying a location of a microseismic event in an earth formation. The system includes a first array of acoustic detectors in a borehole in the earth formation configured to receive acoustic signals resulting from the microseismic event and a second array of detectors at or near a surface of the earth configured to receive acoustic signals resulting from the microseismic event. The medium includes instructions which enable a least one processor to use a time of arrival of the received acoustic signals to estimate the location of the microseismic event, and record the determined location on a suitable medium. The medium may include a ROM, an EPROM, an EAROM, a flash memory, and/or an optical disk.

BRIEF DESCRIPTION OF THE FIGURES

The present disclosure is best understood with a reference to the accompanying drawings in which like numerals referred to like elements and in which.

DETAILED DESCRIPTION

Figure 1:
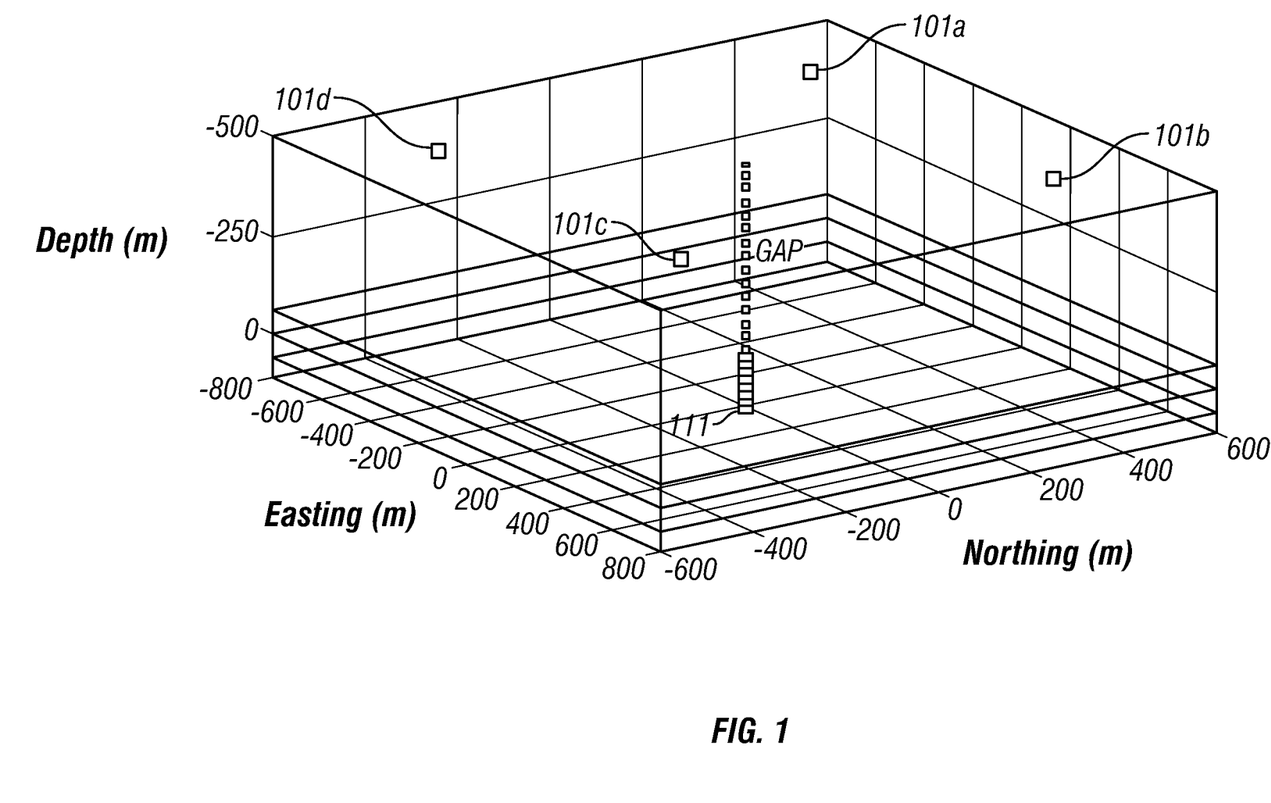
FIG. 1 illustrates an exemplary arrangement of sensors that includes a VSP array and a four-station subsurface array.

Turning to FIG. 1, an exemplary acquisition geometry for the method of the present disclosure is shown. This includes a seven-level VSP 111 with the vertical aperture of 120 m and a square array of four subsurface detectors 101a, 101b, 101c, 101d 500 m above the top level of the VSP array. The specific number of detectors used in the VSP survey is not to be construed as a limitation of the disclosure; in practice, fewer or more detectors may be used. It should further be noted that the borehole in which the VSP array is deployed need not be a vertical borehole. The VSP array and the subsurface array may comprise 3-C detectors. By using 3-C detectors, using known methods, it is easy to identify whether a particular arrival corresponds to a P-wave or an S-wave arrival. Depending upon the surface conditions, the subsurface detectors may actually be at the surface or may be buried at a depth sufficient to get a good signal-to-noise ratio.

In the present disclosure, to determine the uncertainty of hypocenter location, an error ellipsoid is generally calculated to depict the error distribution. The error ellipsoid computation is adopted by many well-used hypocenter location algorithms like HYPOINVERSE (Klein, 2000). HYPOINVERSE is a computer program used by the United States geological survey that processes files of seismic station data for an earthquake (like P-wave arrival times and seismogram amplitudes and durations) into earthquake locations and magnitudes. In the present disclosure, this program is used for determining the location of microseismic events in reservoir monitoring. Based on the method, the points $\theta_p(x_p,y_p,z_p,t_{0p})$ on the p % confidence ellipsoid for the solution $\theta_e(x_e,y_e,z_e,t_{0e})$ is obtained from the equation $(\theta_p-\theta_e)^T Q(\theta_p-\theta_e) \leq \kappa_p^2$, where Q is the parameter covariance matrix, and is derived from $Q=(A^T A)^{-1}$; A is the N×4 matrix of partial derivatives of t with respect to the 4 components of $\theta_e(x_e,y_e,z_e,t_{0e})$ at final iteration of a least-squares hypocenter location procedure; N is the number of the geophones; the confidence coefficient $\kappa_p^2 = M_s^2 F(p;4,N-4)$ where F (p; 4, N−4) is the F distribution with 4 and N−4 degrees of freedom at the p % confidence level. The variance factor, $s^2$, is an estimate of the picking error of arrivals of seismic phases. The semi-axes of the error ellipsoid are obtained from the eigenvalues of Q by using the singular value decomposition method. That is, $R_i^{semi} = (s^2 \text{eigenvalue}_i \times 2F(p; 4, N-4))^{1/2}$.

The one-standard-error (68%) ellipses are calculated at the nodes of a 3-D grid. For convenience in viewing the results, the maximum horizontal and vertical errors of an error ellipse are plotted as contour maps on a series of 2-D horizontal cross sections. A point of novelty of the present disclosure is the use of a VSP array in combination with an array of surface detectors. The top level of an assumed objective VSP array is selected as the zero depth of the 3-D grid, and the positive direction of the coordinates is regarded as downwards. Simulation results are presented for a model in which the velocity is assumed to be constant with ($V_p$=4000 m/s, $V_p/V_s$=1.73). The picking error ($\sigma_i$, i=1 to N) is assumed to be a three-step function of the distance between an event to the geophone ranging from 0.001-0.002-0.004 s and 0.004-0.008-0.012 s for P-arrivals and S-arrivals respectively. This error is considered large enough to contain the errors caused by picking and the inaccuracy of the assumed velocity model. Events are recorded and picked at each station. Events on the nodes of the grid are assumed to be relocated to their original positions.

Figure 2:
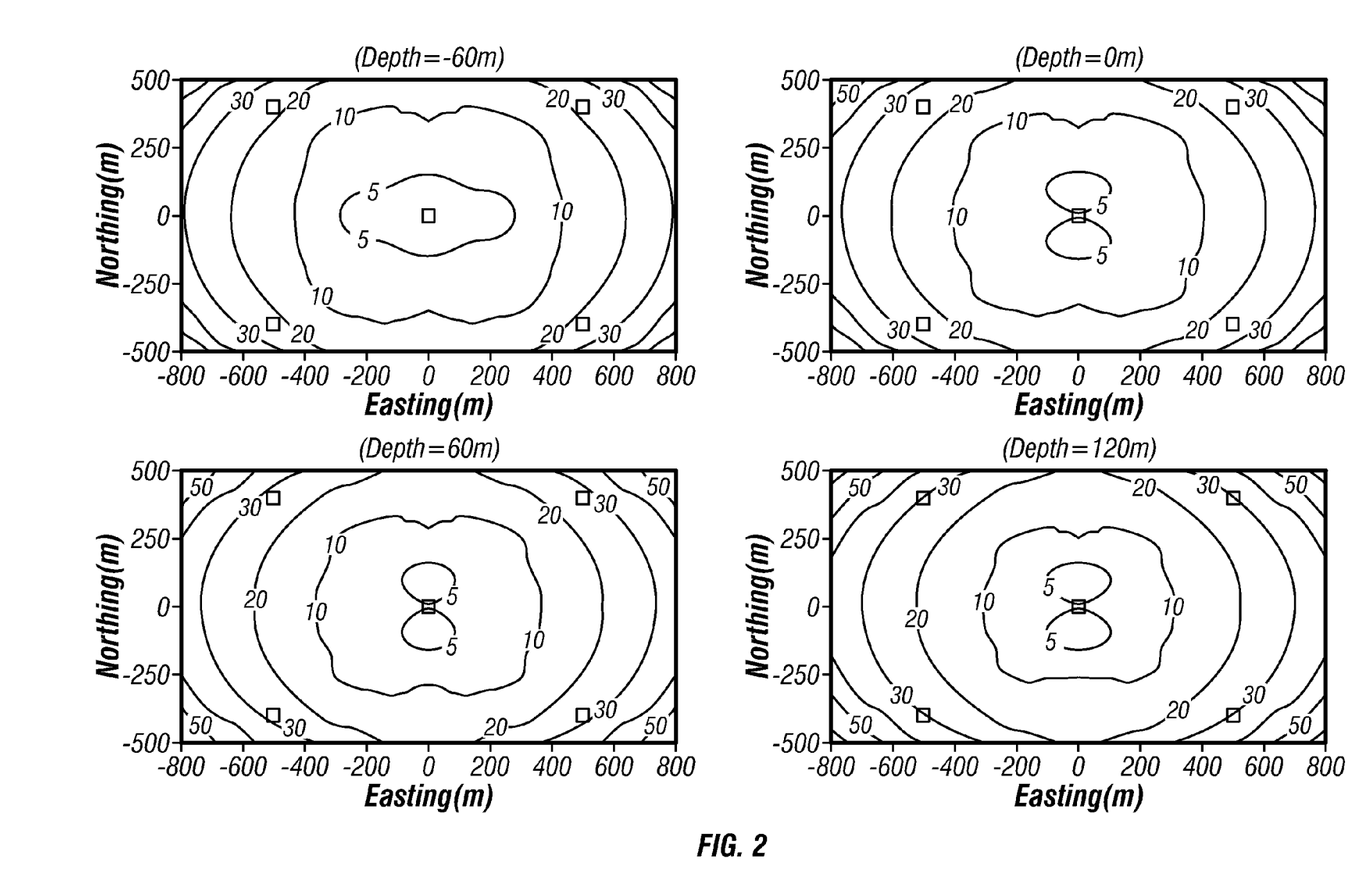
FIG. 2 is a contour map of the horizontal location error at four different depths determined using P-arrivals only for the arrangement of FIG. 1.
Figure 3:
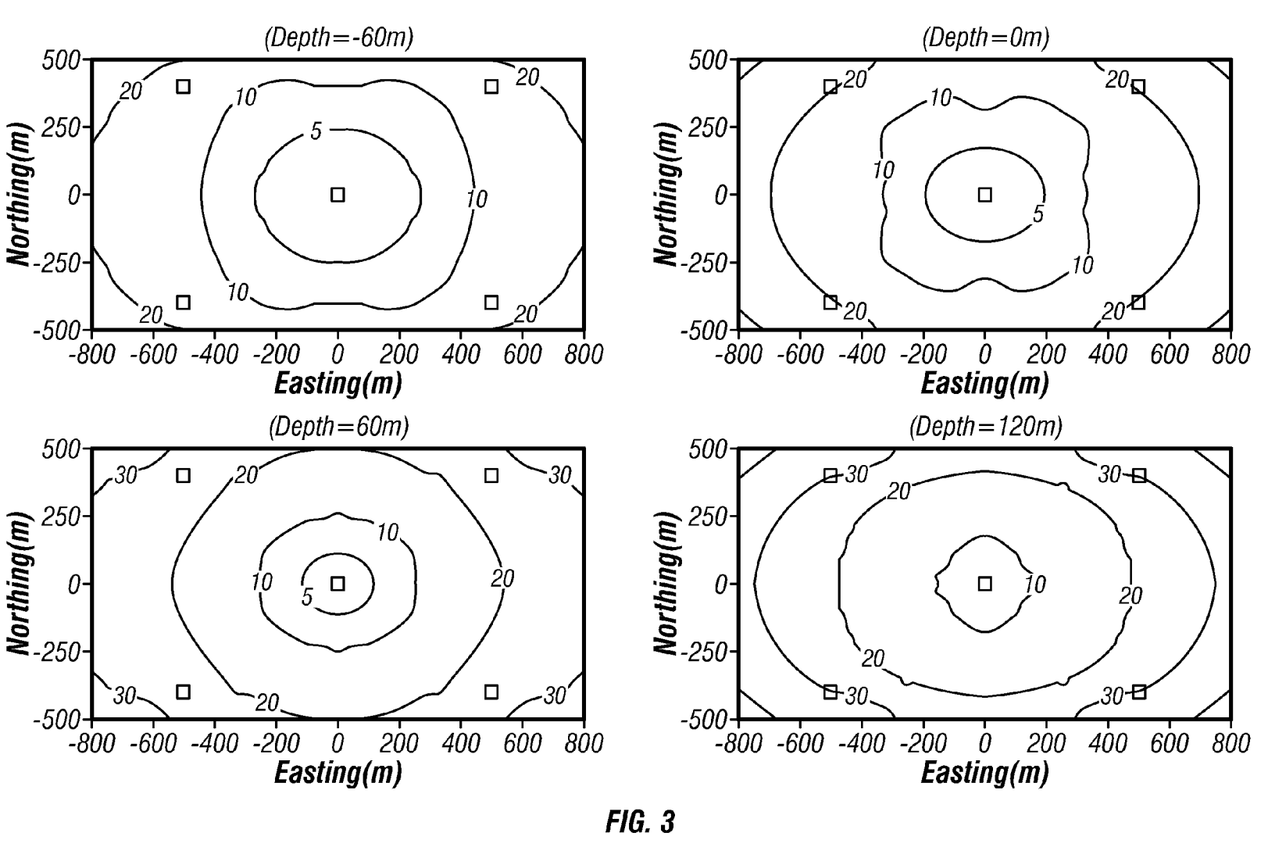
FIG. 3 is a contour map of the vertical location error at four different depths determined using P-arrivals only for the arrangement of FIG. 1.

FIG. 2 shows the horizontal distribution of the one-standard deviation horizontal location errors on four horizontal cross sections from a depth level of −60, 0, 60 and 120 m, while FIG. 3 shows the one-standard deviation vertical location errors at the same depths. For the examples of FIGS. 2 and 3, only P-wave arrival times were used. A depth of zero corresponds to a cross-section at the top of the VSP array. As can be seen, errors are less than 20 m within a radius of 500 m centered from the horizontal projection of the VSP array. In the area with a radius smaller than 250 m, the horizontal errors are less than 10 meters. There is little change of the pattern within the range of the vertical aperture of the VSP wells. Horizontal error increases gradually with the epicenter distance. The vertical errors in location determined by the network are less than 10 m in most areas within the boundaries of the subsurface array on the four horizontal cross profiles. Among the four profiles, the vertical error shows a general trend of decreasing upwards.

Figure 4:
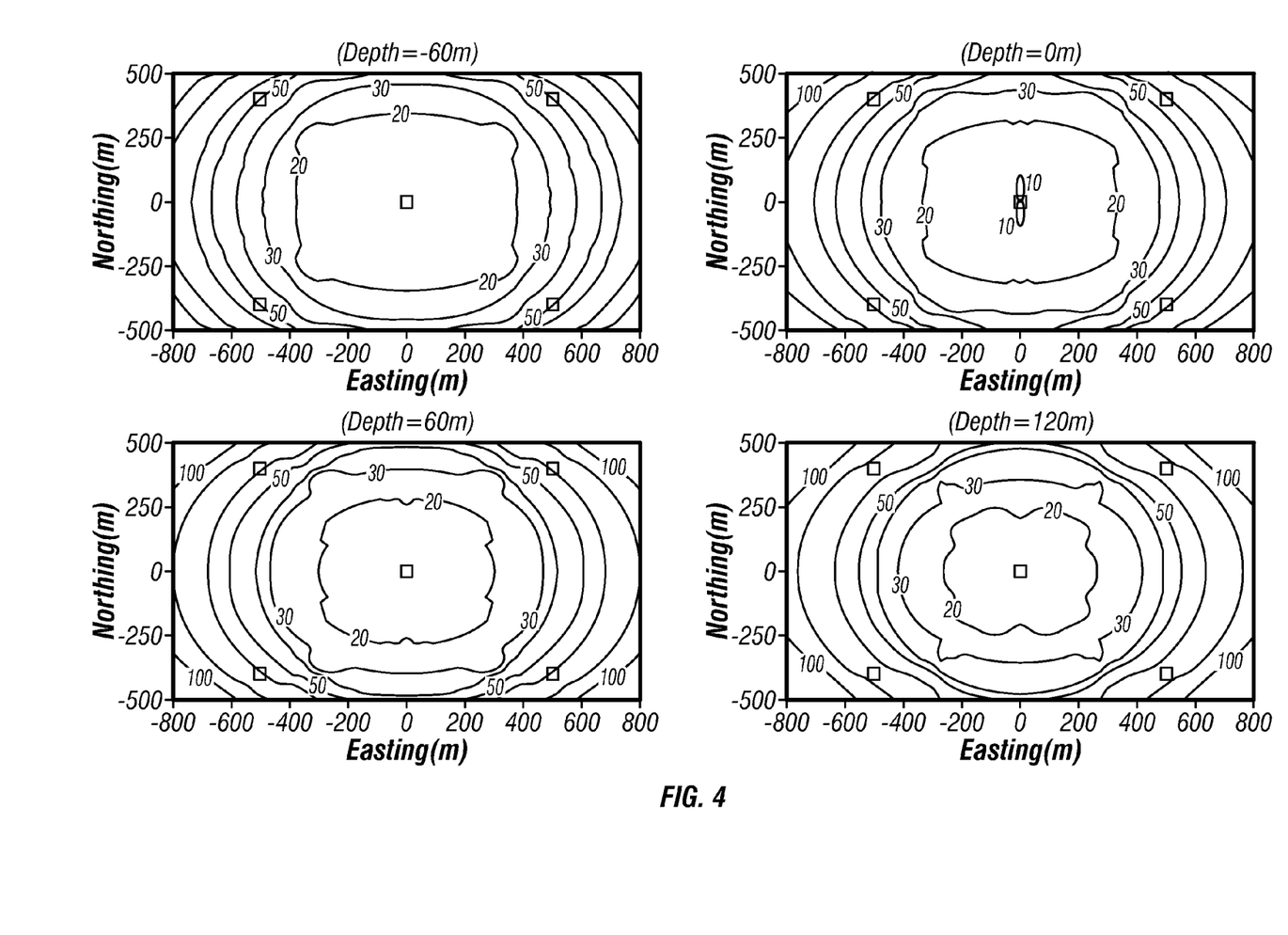
FIG. 4 is a contour map of the horizontal location error at four different depths determined using S-arrivals only for the arrangement of FIG. 1.
Figure 5:
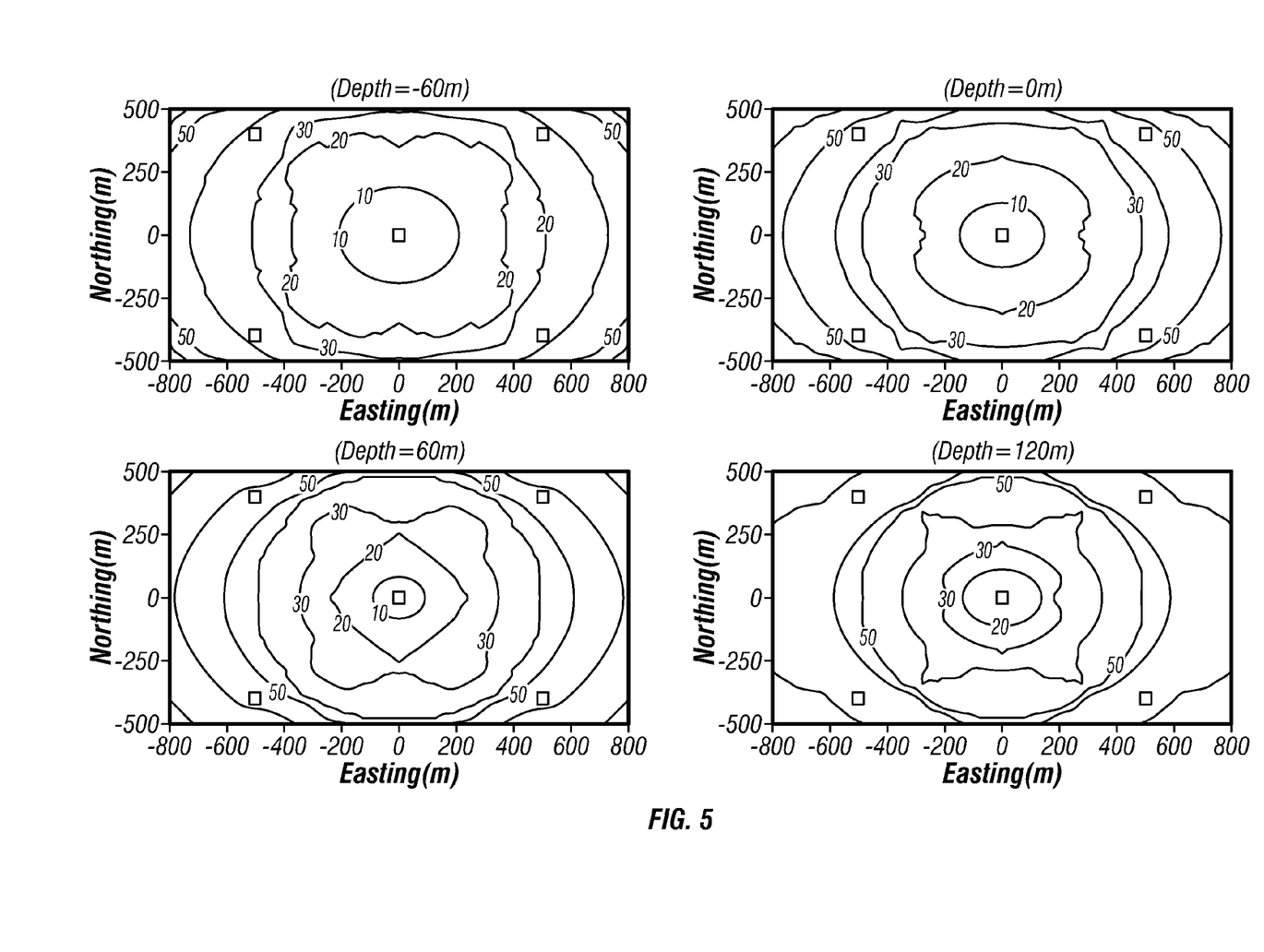
FIG. 5 is a contour map of the vertical location error at four different depths determined using S-arrivals only for the arrangement of FIG. 1.

Turning next to FIGS. 4 and 5, similar results are shown using S-wave arrivals. It can be seen that horizontal errors are generally determined to be less than 30 m within a radius of 500 m centered from the horizontal projection of the VSP array, which is approximately 50% larger that the corresponding error distribution located by P-wave arrivals. For the vertical error, the pattern is similar to the corresponding error distribution derived by using P-wave arrivals, but the errors are almost doubled to approximately 30-40 m within the frame of the subsurface array.

Figure 6:
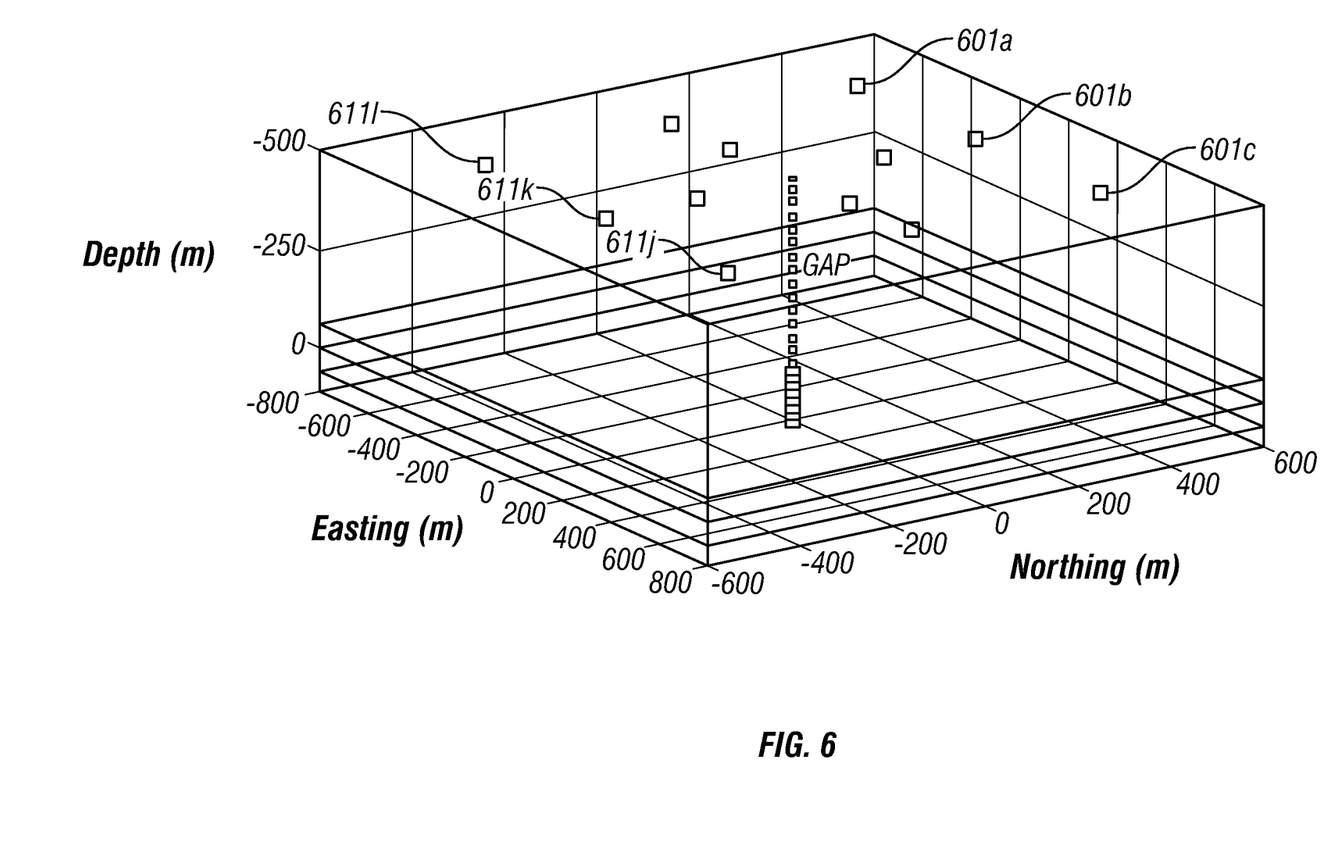
FIG. 6 illustrates an exemplary arrangement of sensors that includes a VSP array and a twelve-station subsurface array.
Figure 7:
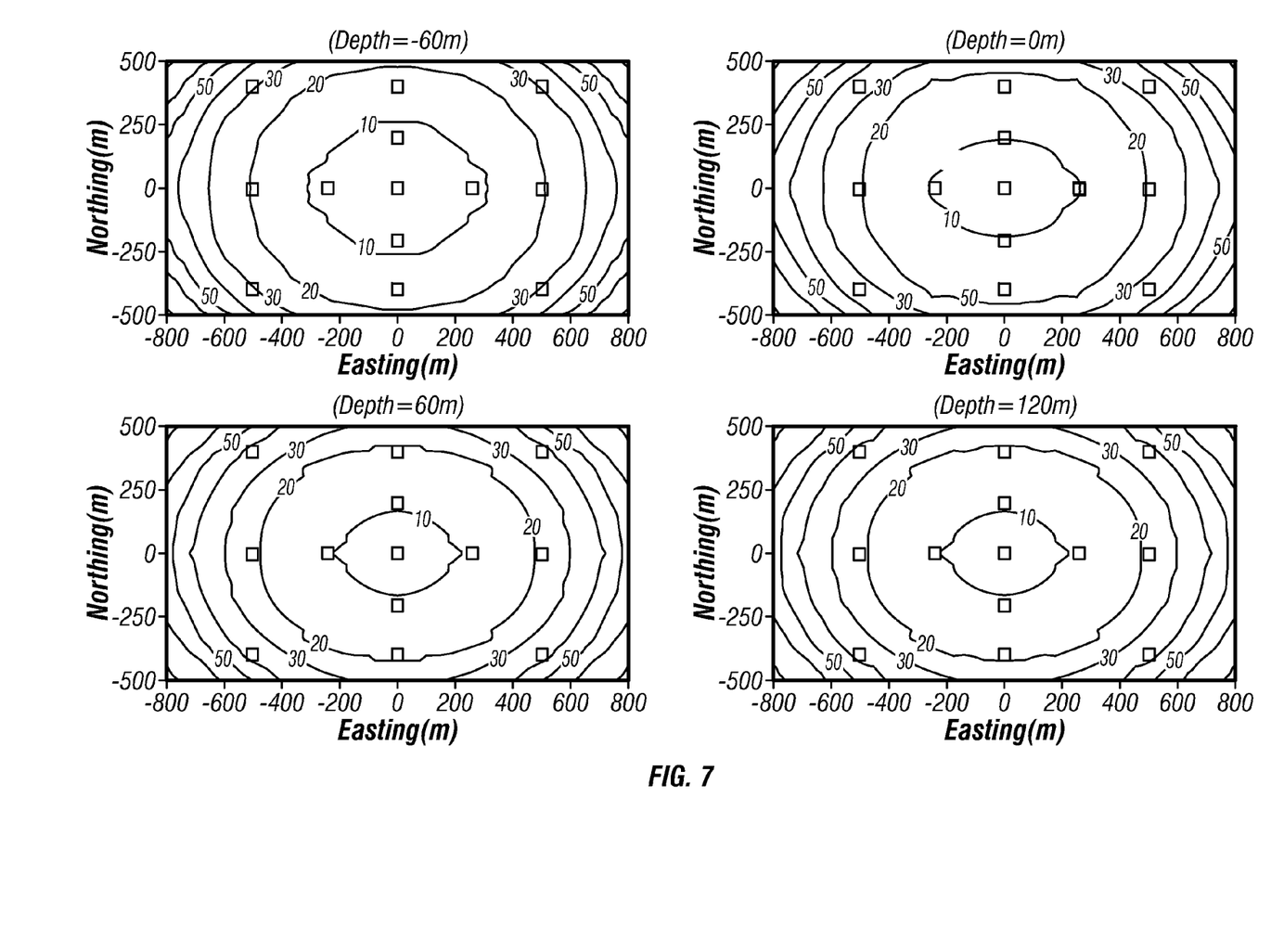
FIG. 7 is a contour map of the horizontal location error at four different depths determined using S-arrivals only for the array of FIG. 6.
Figure 8:
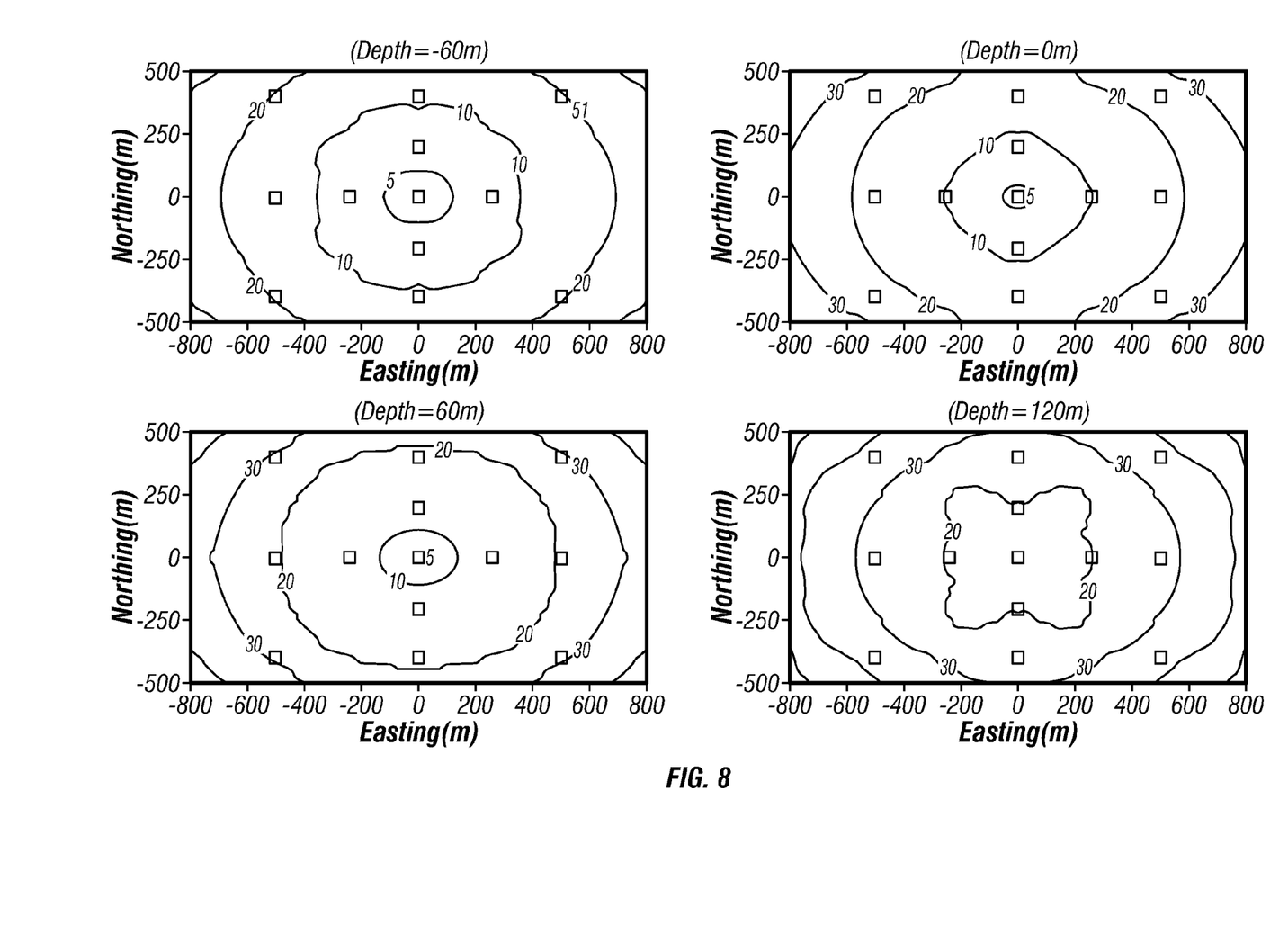
FIG. 8 is a contour map of the vertical location error at four different depths determined using S-arrivals only for the array of FIG. 6.

Considering the relatively low cost and ease of deployment of subsurface geophone stations, it is possible to reduce the location errors by adding more geophones to the subsurface array. This is shown in FIG. 6. A total of 12 subsurface detectors 601a, 601b, 601c, . . . 601j, 601k, 601l are shown. FIGS. 7 and 8 show the location errors calculated based on the upgraded network using S-wave arrivals only. The locations of the subsurface detectors are indicated by the squares in FIGS. 7 and 8. The horizontal location errors are reduced from approximately 30 m to 20 m within a radius centered about the VSP projection. This accuracy is almost comparable to the results derived with an array of four subsurface detectors where P-wave arrivals are used for the calculation. The vertical errors are reduced to less-than-20 to 30 m over almost the entire area of the subsurface array. It should be noted that if the picking errors are smaller, then the horizontal and vertical errors in the hypocenter estimation would also be smaller than the values given in the examples. The ease of deployment is particularly advantageous in the present method: as the inversion is based on arrival times, the orientation of the 3-C geophones does not have to accurately known. Only one or two attributes (the P-wave and/or S-wave arrival times) are essential.

It should further be noted that in the examples given above, a single VSP array has been shown. This is not to be construed as a limitation to the disclosure, and improved accuracy of the inversion may be obtained by using measurements from more than one VSP array.

The advantages and disadvantages of the prior art single VSP method and the method of the present disclosure using a combination of a VSP and a subsurface array method are summarized in Table 1.

TABLE 1

Comparison of the two monitoring and location methods

|  | Single VSP array | VSP + Subsurface array |
|---|---|---|
| Measurements | 4 attributes ($t_p$, $t_s$, azimuth and inclination) | 1-2 attributes ($t_p$ and/or $t_s$) |
| Location accuracy | Several tens meters | <<10-20 meters |
| Efficiency | Time-consuming Less reliable | Fast Reliable |
| Events locatable | With impulsive P first arrivals only(<<50%) | With pickable P, and/or S first arrivals (close to 100%) |
| Waste of events | With ambiguous P arrivals With S arrivals only (>>50%) | Close to none (≈0%) |
| Quantity of locatable events | Small | Large |
| Quality of seismic image | Low | High |

Based upon the results of the hypocenter determination, a map may be produced showing the propagation of the microseismic events over a period of time. Appropriate remedial action may be taken to control the development and propagation of microseismic events in the subsurface. This could include, for example, controlling of injection pressure in a fracturing operation, and opening and closing of flow control devices in injection and production wells.

The inversion methodology described above may be implemented on a general purpose digital computer. As would be known to those versed in the art, instructions for the computer reside on a machine readable memory device such as ROMs, EPROMs, EAROMs, Flash Memories and Optical disks. These may be part of the computer or may be linked to the computer by suitable communication channels, and may be even at a remote location. Similarly, seismic data of the type discussed above may be stored on the computer or may be linked through suitable communication channels to the computer. The communication channels may include the Internet, enabling a user to access data from one remote location and get the instructions from another remote location to process the data. The instructions on the machine readable memory device enable the computer to access the multicomponent data and process the data according to the method described above.

What is claimed is:

1. A method of identifying a location of a microseismic event in an earth formation, the method comprising:
deploying a first array of near vertically spaced apart acoustic detectors in a borehole in the earth formation;
deploying a second array of acoustic detectors at or near a surface of the earth;
receiving acoustic signals at the first array of detectors and at the second array of detectors resulting from the microseismic event in the subsurface;
using a time of arrival of the received acoustic signals to estimate a vertical location of the microseismic event and a horizontal location of the microseismic event; and
determining a statistical measure of uncertainty of the location of the microseismic event using an estimated value of an error in the time of arrival, wherein the statistical measure of uncertainty relates to an error ellipsoid determined using at least (i) a variance factor (s) estimating a picking error of arrivals, (ii) eigenvalues of a parameter covariance matrix, and (iii) a cumulative distribution function (F).

2. The method of claim 1 wherein the acoustic detectors comprise three component detectors.

3. The method of claim 2 further comprising:
 (i) identifying a direction of arrival of the received signals, and
 (ii) using the identified direction of arrival to estimate the vertical and horizontal locations of the microseismic event.

4. The method of claim 1 wherein the microseismic event results from a stress change in the earth formation.

5. The method of claim 4 wherein the stress change results from at least one of: (i) fluid flow in the formation, and (ii) a fracturing operation in the formation.

6. The method of claim 1 wherein the time of arrival further comprises the time of arrival of at least one of: (i) a compressional (P-) wave, and (ii) a shear (S-) wave.

7. The method of claim 1 further comprising repeating (c)-(d) a plurality of times and identifying a change in the vertical and horizontal locations of the microseismic event.

8. The method of claim 7 further comprising taking remedial action based on the identified change in the vertical and horizontal locations of the microseismic event.

9. The method of claim 1 further comprising using the determined statistical measures of uncertainty for changing a number of detectors in the second array.

10. The method of claim 1 wherein the first array of acoustic detectors further comprises multi-component acoustic detectors.

11. The method of claim 1 wherein determining the statistical measure of uncertainty further comprises using a singular value decomposition.

12. A system for identifying a location of a microseismic event in an earth formation, the system comprising:
 a first array of near vertically-spaced acoustic detectors in a borehole in the earth formation configured to receive acoustic signals resulting from the microseismic event;
 a second array of acoustic detectors at or near a surface of the earth configured to receive acoustic signals resulting from the microseismic event; and
 at least one processor configured to:
 use a time of arrival of the received acoustic signals to estimate a vertical location of the microseismic event and a horizontal location of the microseismic event; and
 determine a statistical measure of uncertainty of the vertical location of the microseismic event and a statistical measure of uncertainty of the horizontal location of the microseismic event using an estimated value of an error in the time of arrival, wherein the statistical measure of uncertainty relates to an error ellipsoid determined using at least (i) a variance factor (s) estimating a picking error of arrivals, (ii) eigenvalues of a parameter covariance matrix, and (iii) a cumulative distribution function (F).

13. The system of claim 12 further comprising a device for conducting a fracturing operation in the formation, wherein the microseismic event results from a stress change in the earth formation resulting from the fracturing operation.

14. The system of claim 12 wherein the at least one processor is further configured to use the time of arrival of at least one of: (i) a compressional (P-) wave, and (ii) a shear (S-) wave.

15. The system of claim 12 wherein the first array of acoustic detectors and the second array of acoustic detectors are further configured to receive acoustic signals at a plurality of additional times and wherein the at least one processor is further configured to identify a change in the vertical and horizontal locations of the microseismic event using the acoustic signals received at the plurality of additional times.

16. The system of claim 15 wherein the at least one processor is further configured to take remedial action based on the identified change in the vertical and horizontal locations of the microseismic event.

17. The system of claim 12 wherein the at least one processor is further configured to determine the statistical measure of uncertainty by further using a singular value decomposition.

18. A tangible non-transitory computer readable medium product having stored thereon instructions which when read by at least one processor cause the at least one processor to perform a method, the method comprising:
 receiving acoustic signals, resulting from a microseismic event, at a first array of near vertically-spaced apart acoustic detectors deployed in a borehole in the earth formation and at a second array of acoustic detectors deployed at or near a surface;
 using a time of arrival of the received acoustic signals to estimate a vertical location of the microseismic event and a horizontal location of the microseismic event; and
 determining a statistical measure of uncertainty of the location of the microseismic event using estimated value in an error of the time of arrival, wherein the statistical measure of uncertainty relates to an error ellipsoid determined using at least (i) a variance factor (s) estimating a picking error of arrivals, (ii) eigenvalues of a parameter covariance matrix, and (iii) a cumulative distribution function (F).

19. The tangible non-transitory computer readable medium product of claim 18 further comprising at least one of: (i) a ROM, (ii) an EPROM, (iii) an EAROM, (iv) a flash memory, and (v) an optical disk.

* * * * *